C. C. DABELSTEIN.
EMERGENCY TIRE.
APPLICATION FILED JUNE 27, 1913.
1,095,386.  Patented May 5, 1914.
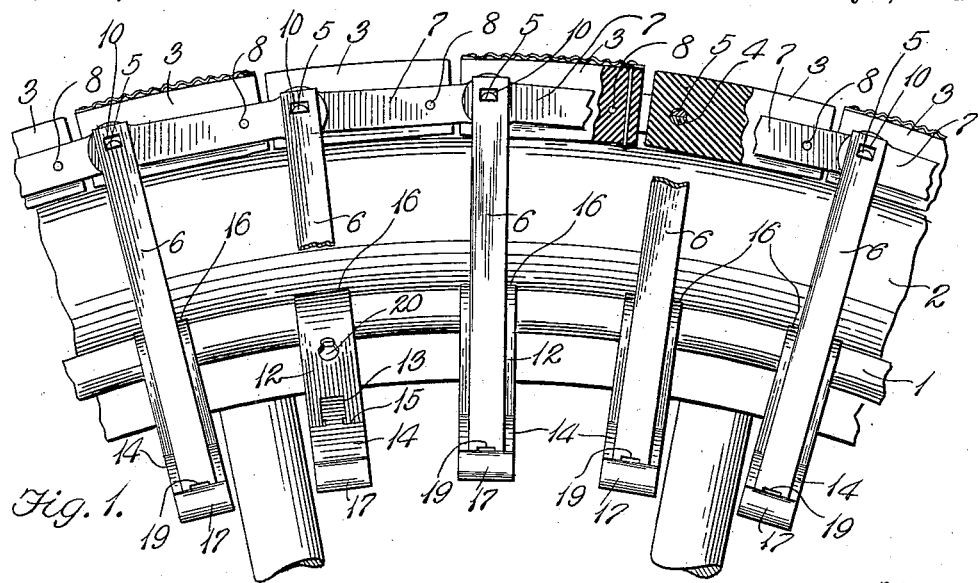
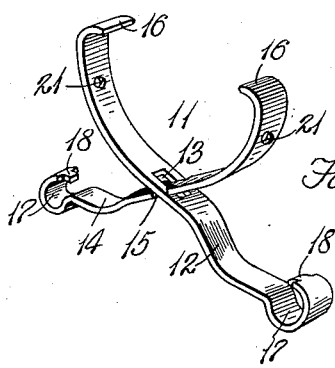
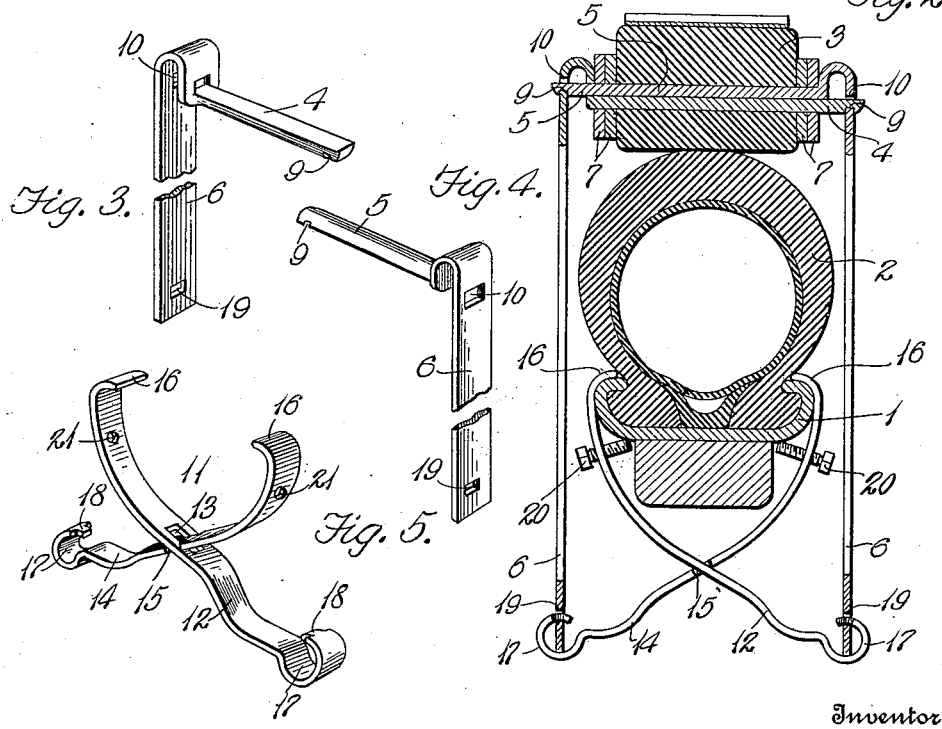
Witnesses
Chas. W. Stauffiger
J. A. Noelke
Inventor
Charles C. Dabelstein,
By
Attorneys

UNITED STATES PATENT OFFICE.

CHARLES C. DABELSTEIN, OF DETROIT, MICHIGAN.

EMERGENCY-TIRE.

1,095,386.  Specification of Letters Patent.  Patented May 5, 1914.

Application filed June 27, 1913. Serial No. 776,034.

*To all whom it may concern:*

Be it known that I, CHARLES C. DABELSTEIN, a citizen of the United States of America, residing at Detroit, in the county of Wayne and State of Michigan, have invented certain new and useful Improvements in Emergency-Tires, of which the following is a specification, reference being had therein to the accompanying drawings.

This invention relates to a supplemental tire for vehicles, and more particularly to an emergency tire for wheels which are supplied with pneumatic tires, and its object is to provide a device which may be quickly attached and which when detached may be folded for storage in a small space.

A further object of the invention is to so construct such a tire that it may be placed upon the wheel for use without necessitating the removal of the pneumatic tire, said emergency tire yieldingly supporting the load independently of said tire.

A further object of the invention is to provide a tire having certain other new and useful features hereinafter more fully described.

To these ends the invention consists in the matter hereinafter more fully described and pointed out in the appended claims, reference being had to the accompanying drawings, in which:

Figure 1, is a side elevation of a portion of a wheel with a pneumatic tire in place thereon and showing a portion of an emergency tire embodying the invention in place thereon. Fig. 2, is a transverse vertical section of the same. Fig. 3, is a perspective detail of one of the supporting springs. Fig. 4, is a similar view of a companion supporting spring; and Fig. 5, is a like view of a pair of attaching hooks.

As shown in the drawings, 1 represents a wheel rim of any desired construction, and 2 is a pneumatic tire of any well known form held in place in the usual manner upon the wheel rim.

The supplemental or emergency tire comprises a tread formed of a series of independent blocks 3 which are formed of rubber or other suitable material with transverse holes therein near the end thereof, the hole at one end of each block being adapted to receive a pivot pin which comprises two arms 4 and 5 formed integral at one end with supporting members 6. Each arm is formed semi-circular in cross section and when one arm is placed upon the other with both extending through the openings in the block, they form a round pivot for the block and also for links 7 having openings in their overlapped ends through which the arms extend. Each block is secured to the links which engage it along each side, by the pivot members and by a pin or rivet 8 extending through the hole at the opposite end of the block and through the links. The blocks are thus pivotally connected and firmly supported by the links.

The free end of each of the arms 4 and 5, is formed with a notch 9 and the flat spring supporting member with which each arm is integrally formed, is provided with an opening 10 to receive said free end of the arm of the companion member. The flat portion of each supporting member is bent upwardly from the end of its arm and then outwardly and downwardly to extend radially of the wheel at each side of the wheel rim and pneumatic tire thereon. When the parts are assembled, the arms 4 and 5 are inserted through the blocks and links longitudinally from opposite sides with the arm 5 upon the flat upper side of the arm 4 and when the free ends of the arms engage the holes 10, the notches 9 will snap into engagement with the edges of said openings and firmly hold the parts interlocked and the links pivotally connected.

To detachably support the inner ends of the several pairs of supporting members 6, a pair of crossed levers 11 is provided for each pair of supports. Each pair of levers is similar to a pair of tongs, one of the levers 12 being formed with a slot 13 intermediate its ends and the other lever 14 being formed with notches 15 in its sides so that it may be passed through the slot of the lever 12 and then turned to bring its notches into engagement with said lever at each side of the slot. The levers are thus pivotally connected intermediate their ends and at its upper end each lever is formed with an inturned or hooked end 16 to engage over the edges of the wheel rim 1. The opposite ends of the levers are bent into eyes 17 and on its end each lever is formed with a lug 18 to engage an opening 19 in the lower or inner end of one of the members 6. The eyes 17 are so formed and the openings 19 are placed at such a distance from the ends of said members, that when said members are forced into the eyes, the lugs 18 will snap into the holes 19 and securely and pivotally connect the ends of the levers with the ends of the spring members. Owing to the crossing of the levers 11, the greater the weight upon the tire, the closer the hooks 16 will engage the rim to hold the tire in place, but to prevent the hooks from becoming disengaged when they are not under load, a set screw 20 is screwed into an opening 21 in each lever into engagement with the inner side of the rim. The curvature of the hooks 16 is sufficient that said hooks are bound upon the rim 1 when the set screws 20 are tight, and with the inner ends of the levers connected to the supporting members there is no danger of said levers becoming accidentally displaced under ordinary operating condition. The levers are preferably formed of spring metal and owing to their crossed position, they will yield readily under load to give the necessary resiliency to the tire.

The members 6 are of such length that they will support at all times the blocks 3 forming the tread of the tire, at such a distance from the rim that the pneumatic tire will be relieved of all load and all liability of injury to it should it become deflated from any cause, will be obviated. These arms or members may also be made of spring metal if found desirable to yield under load. As the parts are detachably connected they may be quickly detached from the wheel and the pivotally connected tread blocks and their supporting arms folded into a small space.

Obviously changes may be made in the construction and arrangement of parts without departing from the spirit of my invention, and I do not therefore limit myself to the form or arrangement shown.

Having thus fully described my invention what I claim is:

1. In an emergency tire, the combination of a series of pivotal connected tread members, supporting members attached to the sides of the tread members and extending radially inward at each side of a tire upon a wheel rim, and crossed levers detachably engaging the wheel rim and connected to the supporting members to support the same.

2. In an emergency tire, the combination of a series of tread blocks, a series of links at each side of said blocks, pivot members extending through the links and blocks to pivotally connect the links and support the blocks, supporting members connected to the ends of the pivot members and extending inward at each side of a tire upon a wheel rim and means for detachably and yieldingly connecting the inner ends of the supporting members to the wheel.

3. In an emergency tire, the combination of a series of tread blocks, a series of links at each side of said blocks having overlapped ends, supporting members having laterally extending arms projecting through openings in the overlapped ends of the links and through the blocks to pivotally connect the links and support the blocks, and crossed levers adapted to detachably engage a wheel rim connected to the ends of the supporting members to attachably connect the supporting members to a wheel.

4. In an emergency tire, the combination of a series of tread blocks, a series of links having overlapped ends provided with openings, a series of supporting members arranged in pairs and formed with laterally extending arms formed semi-circular in cross section, one arm of one member of each pair of members being adapted to lie upon the arm of the other member of each pair and said arms being extended through the openings in the links and through the blocks and together forming pivots for said links, said supporting members being formed with flat portions extending radially inward at each side of a tire upon a wheel, and members adapted to connect the inner ends of the supporting members to a wheel.

5. In an emergency tire, the combination of a series of pivotally connected tread blocks, supporting members connected to each side of the tread blocks extending radially inward of a tire upon a wheel rim, and crossed levers having hooked outer ends to engage over the wheel rim and having laterally extending inner ends connected to the ends of the supporting members.

6. In an emergency tire, the combination of a series of tread blocks, a series of links secured to the sides of the blocks and having overlapped ends provided with openings, supporting members having laterally extending pivot arms extending through the openings in the ends of the links and formed with flat portions to extend radially inward at each side of a tire upon a wheel rim, a series of crossed levers pivotally connected intermediate their ends and formed with hooked outer ends to engage over the rim of a wheel and means for detachably attaching the inner ends of the supporting members to the extended inner ends of the crossed levers.

In testimony whereof I affix my signature in presence of two witnesses.

CHARLES C. DABELSTEIN.

Witnesses:
 OTTO F. BARTHEL,
 G. E. McGRANN.